US 11,165,592 B2

(12) United States Patent
Barreto

(10) Patent No.: US 11,165,592 B2
(45) Date of Patent: Nov. 2, 2021

(54) SYSTEMS AND METHODS FOR A BUTTERFLY KEY EXCHANGE PROGRAM

(71) Applicant: LG ELECTRONICS, INC., Seoul (KR)

(72) Inventor: Paulo Sergio Licciardi Messeder Barreto, Santa Clara, CA (US)

(73) Assignee: LG Electronics, Inc., Seoul (KR)

(*) Notice: Subject to any disclaimer, the term of this patent is extended or adjusted under 35 U.S.C. 154(b) by 151 days.

(21) Appl. No.: 16/634,874

(22) PCT Filed: Aug. 21, 2019

(86) PCT No.: PCT/US2019/047547
§ 371 (c)(1),
(2) Date: Jan. 28, 2020

(87) PCT Pub. No.: WO2020/041499
PCT Pub. Date: Feb. 27, 2020

(65) Prior Publication Data
US 2021/0211306 A1    Jul. 8, 2021

Related U.S. Application Data

(60) Provisional application No. 62/720,866, filed on Aug. 21, 2018.

(51) Int. Cl.
*H04L 9/32* (2006.01)
*H04L 9/08* (2006.01)
*H04L 9/30* (2006.01)

(52) U.S. Cl.
CPC .......... *H04L 9/3268* (2013.01); *H04L 9/0852* (2013.01); *H04L 9/3013* (2013.01); *H04L 9/3066* (2013.01); *H04L 9/3252* (2013.01)

(58) Field of Classification Search
CPC ... H04L 9/3268; H04L 9/0852; H04L 9/3013; H04L 9/3066; H04L 9/3252
(Continued)

(56) References Cited

U.S. PATENT DOCUMENTS 7,697,693 B1 * 4/2010 Elliott ................... H04B 10/70
380/278
2004/0158708 A1 * 8/2004 Peyravian ............. H04L 9/0825
713/156
(Continued)

FOREIGN PATENT DOCUMENTS

WO       2018026807 A1     2/2018
WO    WO-2020229586 A1 * 11/2020 ........... H04L 9/3268

OTHER PUBLICATIONS

Charan et al., "Generation of Symmetric Key Using Randomness of Hash Function", IEEE, doi: 10.1109/ICCCNT49239.2020.9225280, 2020, pp. 1-7. (Year: 2020).*
IP.Com, "Butterfly Keys—Jun. 23, 2011", IP.com, IPCOM000208116D, Jun. 23, 2011, pp. 1-11. (Year: 2011).*
Hammi et al., "Using butterfly keys: A performance study of pseudonym certificates requests in C-ITS", IEEE, doi: 10.1109/CSNET.2017.8242002, 2017, pp. 1-6. (Year: 2017).*
(Continued)

*Primary Examiner* — Peter G Shaw
(74) *Attorney, Agent, or Firm* — Duane Morris LLP

(57) ABSTRACT

Embodiments described herein provide an implicit protocol with improved resource and bandwidth efficiency. A post-quantum secure approach for issuing multiple pseudonym certificates from a small piece of information is provided, while traditionally most encryption schemes are vulnerable to post-quantum attacks (e.g., in a traditional SCMS). Long-term security can be improved with the post-quantum protocol.

6 Claims, 7 Drawing Sheets

(58) Field of Classification Search
USPC .......................................................... 713/156
See application file for complete search history.

(56) References Cited

U.S. PATENT DOCUMENTS

| | | | | |
|---|---|---|---|---|
| 2010/0293378 | A1* | 11/2010 | Xiao | H04W 12/0431 |
| | | | | 713/168 |
| 2014/0016776 | A1* | 1/2014 | Van Foreest | H04L 9/0869 |
| | | | | 380/46 |
| 2017/0222990 | A1 | 8/2017 | Romansky et al. | |
| 2018/0176209 | A1 | 6/2018 | Narayanan et al. | |
| 2019/0123915 | A1* | 4/2019 | Simplicio, Jr. | H04W 12/069 |
| 2020/0382320 | A1* | 12/2020 | Ogawa | H04L 9/3268 |
| 2021/0111904 | A1* | 4/2021 | Ogawa | H04L 9/3263 |

OTHER PUBLICATIONS

Simplicio et al., "The Unified Butterfly Effect: Efficient Security Credential Management System for Vehicular Communications", IEEE, doi: 10.1109/VNC.2018.8628369, 2018, pp. 1-8. (Year: 2018).*

Brecht et al., "A Security Credential Management System for V2X Communications," arXiv:1802.05323v1, Feb. 14, 2018, pp. 1-26.

International Search Report and Written Opinion from PCT/US2019/047547, dated Dec. 17, 2019, pp.

Kolleda et al., "National Security Credential Management System (SCMS) Deployment Support: Literature Search Report," retrieved from the Internet: <URL: https://www.researchgate.net/publication/323217194_A_Security_Credential_Management_System_for_V2X_Communications>, pp. 1-104.

* cited by examiner

| | Vehicle 102a-b | → | RA 108 | → | PCA 105 | ←RA← 108 | Vehicle 102a-b |
|---|---|---|---|---|---|---|---|
| (explicit) 401 | $s \xleftarrow{\$} \mathbb{Z}_q$ $S \leftarrow s \cdot G$ | $S, f$ | $\hat{S}_i \leftarrow S + f(i) \cdot G$ $(0 \leq i < \beta)$ | $\hat{S}_i$ | $r_i \xleftarrow{\$} \mathbb{Z}_q$ $U_i \leftarrow \hat{S}_i + r_i \cdot G$ $sig_i \leftarrow Sign(u, (U_i, \text{meta}))$ $cert_i \leftarrow \{U_i, \text{meta}, sig_i\}$ $pkg \leftarrow Enc(\hat{S}_i, (cert_i, r_i))$ | $pkg$ | $\hat{s}_i \leftarrow s + f(i)$ $(cert_i, r_i) \leftarrow Dec(\hat{s}_i, pkg)$ $Ver(U_i, cert_i)$ $u_i \leftarrow \hat{s}_i + r_i$ NB: $u_i \cdot G = U_i$ |
| (implicit) 402 | | | | | $r_i \xleftarrow{\$} \mathbb{Z}_q$ $V_i \leftarrow \hat{S}_i + r_i \cdot G$ $cert_i \leftarrow (V_i, \text{meta})$ $h_i \leftarrow \mathcal{H}(cert_i)$ $sig_i \leftarrow h_i r_i + u$ $pkg \leftarrow Enc(\hat{S}_i, (cert_i, sig_i))$ | | $\hat{s}_i \leftarrow s + f(i)$ $(cert_i, sig_i) \leftarrow Dec(\hat{s}_i, pkg)$ $h_i \leftarrow \mathcal{H}(cert_i)$ $u_i \leftarrow h_i \hat{s}_i + sig_i$ others: $U_i \leftarrow h_i \cdot \hat{S}_i + V_i + \mathcal{U}$ NB: $u_i \cdot G = U_i$ |
| (implicit Schnorr) 403 | | | | | $r_i \xleftarrow{\$} \mathbb{Z}_q$ $V_i \leftarrow \hat{S}_i + r_i \cdot G$ $cert_i \leftarrow (V_i, \text{meta})$ $h_i \leftarrow \mathcal{H}(cert_i, \mathcal{U})$ $sig_i \leftarrow r_i + h_i \cdot u$ $pkg \leftarrow Enc(\hat{S}_i, (cert_i, sig_i))$ | | $\hat{s}_i \leftarrow s + f(i)$ $(cert_i, sig_i) \leftarrow Dec(\hat{s}_i, pkg)$ $u_i \leftarrow \hat{s}_i + sig_i$ others: $h_i \leftarrow \mathcal{H}(cert_i, \mathcal{U})$ $U_i \leftarrow V_i + h_i \cdot \mathcal{U}$ NB: $u_i \cdot G = U_i$ |

SYSTEMS AND METHODS FOR A BUTTERFLY KEY EXCHANGE PROGRAM

CROSS REFERENCE TO RELATED APPLICATIONS

This patent application is a U.S. National Stage patent application of International Patent Application No. PCT/US2019/047547, "SYSTEMS AND METHODS FOR A BUTTERFLY KEY EXCHANGE PROGRAM," filed on 21 Aug. 2019, which claims priority to U.S. Provisional Patent Application No. 62/720,866, "IMPLICIT SCHNORR AND THE UNIFIED POST-QUANTUM BUTTERFLY KEY EXCHANGE PROGRAM," filed on 21 Aug. 2018, which are hereby expressly incorporated herein by reference herein in their entireties.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The invention is related to privacy in vehicular communications, in particular for scenarios that use pseudonym certificates to enable secure and privacy-preserving communications between vehicles.

BACKGROUND

Vehicular entities usually communicate with each other through a secured communication mechanism. The Security Credential Management System (SCMS) has been used as a leading vehicular public-key infrastructure (VPKI) candidate designs for protecting vehicle-to-vehicle (V2V) and vehicle-to-infrastructure (V2I) communications. Specifically, the SCMS combines an efficient and privacy-preserving method for vehicles to obtain large batches of pseudonym certificates (also known as butterfly key expansion), and an ancillary process for revoking the user's privacy in case of misbehavior, so that multiple certificates belonging to the same user can be linked together. In SCMS, however, the security of the construction relies on the hardness of the elliptic curve discrete logarithm problem (ECDLP). As a result, its security properties may be lost in a post-quantum setting, i.e., if a large-enough quantum computer is built for running Shor's algorithm, attackers may have sufficient time to solve the ECDLP in polynomial time and thus launch a successful attack on the SCMS.

SUMMARY

This section summarizes some features of the invention. Other features may be described in the subsequent sections. The invention is defined by the appended claims, which are incorporated into this section by reference.

Some embodiments of the present invention provide a method for providing digital certificates for use by devices in authentication operations. Specifically, a cocoon public key is received at a first entity for generating a digital certificate. The cocoon public key is generated by expanding a caterpillar public key with a random function and the first entity is uninformed of which device the caterpillar public key is originated from. Butterfly reconstruction credentials are generated based on the cocoon public key and a random value. A certificate is generated based on the butterfly reconstruction credentials and metadata. A hash value is generated of both the certificate and a verification public key reserved for the first entity. A signature is generated based on the random value, the hash value and a verification private key associated with the verification public key. The certificate and the signature are encrypted using the cocoon public key. The encryption package from the encrypted certificate and signature is sent to a second entity. The second entity is unable to decrypt the encryption package, and the encryption package is forwarded from the second entity to a requesting device.

Some embodiments of the present invention provide a method for using digital certificates in authentication operations. An encryption package forwarded by a second entity that is unable to decrypt the encryption package is received, at a device and from a first entity. A private cocoon key is generated for decrypting the encryption package based on a private key associated with the device and a random function. The encryption package is decrypted using the private cocoon key into a certificate and a signature. A hash value of both the certificate and a verification public key reserved for the first entity. A verification private key reserved for the device is generated based on the private cocoon key and the signature. A verification public key reserved for the device is generated based on the verification public key reserved for the first entity, the hash value and butterfly reconstruction credentials. It is then verified that the generated verification public key reserved for the device and the generated verification private key satisfies a relationship.

Some embodiments of the present invention provide a method for using a ring-learning-with-errors (RLWE) based post-quantum protocol to provide digital certificates for use by devices in authentication operations. Specifically, a cocoon public key for generating a digital certificate is received at a first entity. The cocoon public key is generated by expanding a caterpillar public key with a first random function and a second random function, and the first entity is uninformed of which device the caterpillar public key is originated from. A verification public key reserved for the device is generated based on the received cocoon public key, a first pseudo-random value and a second pseudo-random value sampled from a 0-centered discrete Gaussian distribution on a first multi-dimensional space with a first standard deviation value according to a pseudo-random sampler having a seed value. A signature is generated over the verification public key reserved for the device along with metadata, a verification public key reserved for the first entity and a private key pair reserved for the first entity. A set of the seed value, the metadata and the signature is encrypted into an encryption package. The encryption package is sent to a second entity. The second entity is unable to decrypt the encryption package, and the encryption package is forwarded from the second entity to a requesting device.

Some embodiments of the present invention provide a method for using a ring-learning-with-errors (RLWE) based post-quantum protocol to verify digital certificates for use by devices in authentication operations. An encryption package forwarded by a second entity that is unable to decrypt the encryption package is received, at a device and from a first entity. A private cocoon key pair for decrypting the encryption package is generated based on a caterpillar private key pair associated with the device, a first random function and a second random function. The encryption package is decrypted using the private cocoon key pair into a set of a seed value, metadata and a signature. A verification public key reserved for the device is generated based on a public cocoon key, a first pseudo-random value and a second pseudo-random value sampled from a 0-centered discrete Gaussian distribution on a first multi-dimensional space with a first standard deviation value according to a pseudo-random sampler having the seed value. A verification private key pair reserved for the device is generated based on a private cocoon key pair, the first pseudo-random value and the second pseudo-random value. It is then verified that the generated verification public key reserved for the device and the generated verification private key pair satisfies a relationship.

BRIEF DESCRIPTION OF THE DRAWINGS

FIG. 4 is an example table that compares existing explicit and implicit protocols with an implicit protocol with Schnorr-style signatures, according to embodiments described herein.

FIG. 6 provides an example table that compares the ECC-based (pre-quantum) and the lattice-based (post-quantum) variants of the explicit butterfly protocol, according to some embodiments described herein.

DETAILED DESCRIPTION OF SOME EMBODIMENTS

This description and the accompanying drawings that illustrate aspects, embodiments, implementations, or applications should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail as these are known to one skilled in the art. Like numbers in two or more figures represent the same or similar elements.

In this description, specific details are set forth describing some embodiments consistent with the present disclosure. Numerous specific details are set forth in order to provide a thorough understanding of the embodiments. It will be apparent to one skilled in the art, however, that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

The following notations are used throughout the description:

r, ε—random numbers;
sig—a digital signature;
cert—a digital certificate;
meta—metadata of the digital certificate;
U, $\mathcal{U}$—public signature keys (stylized $\mathcal{U}$: reserved for the pseudonym certificate authority)
u, u—private signature keys associate with U, $\mathcal{U}$
S, s—public and private caterpillar keys;
Ŝ, ŝ—public and private cocoon keys;
V—public key reconstruction credential;
β—number of cocoon keys in a batch of certificates;
f, g—pseudo-random functions;
$\mathcal{H}$(str)—hash of bitstring str;
Enc (K, str)—encryption of bitstring str with encryption key K.

Introduction

Figure 1:
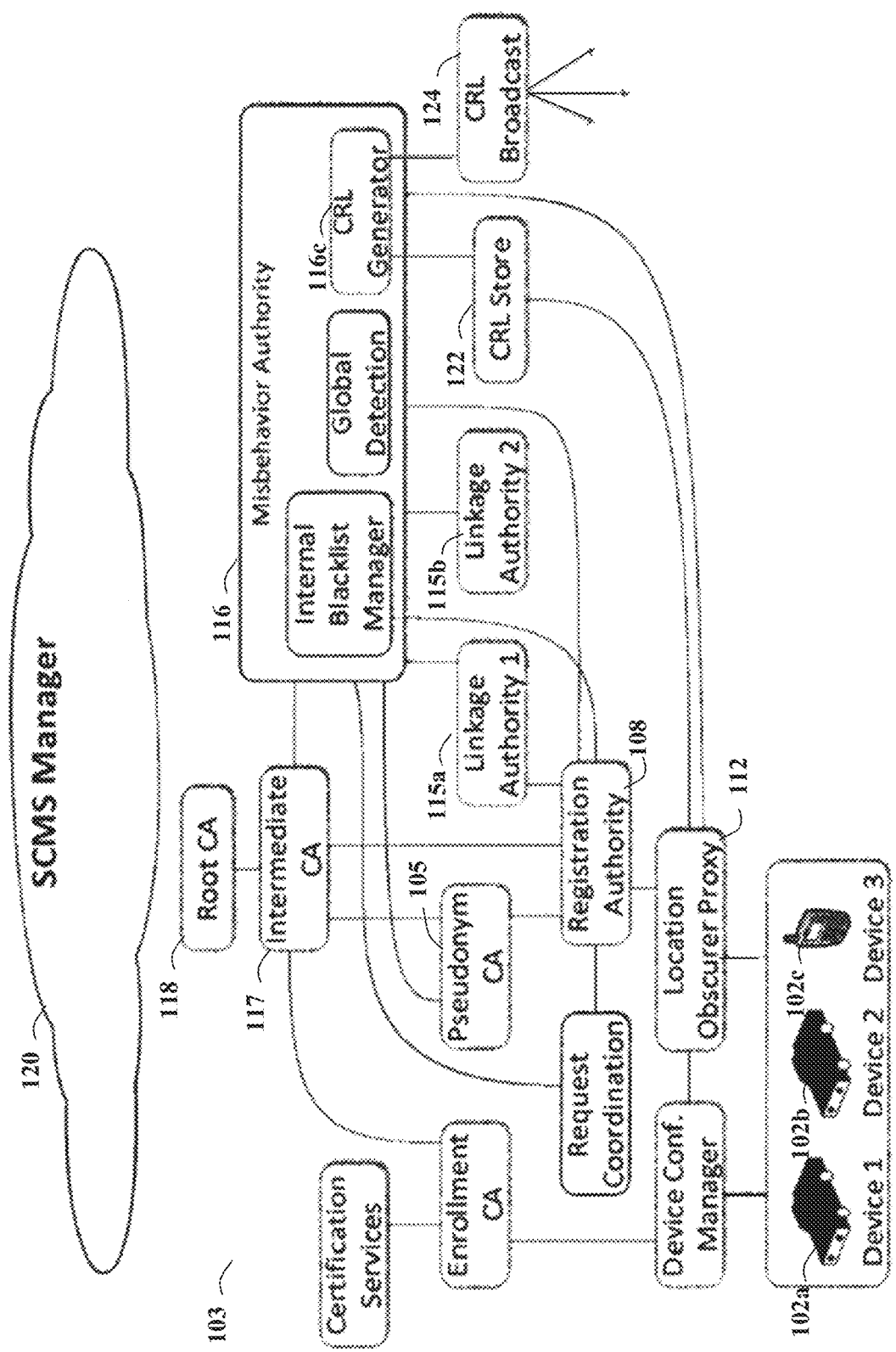
FIG. 1 illustrates an example SCMS infrastructure in which systems and methods of the present disclosure can operate.

FIG. 1 illustrates an example SCMS infrastructure in which systems and methods of the present disclosure can operate. Devices 102a-c, which may be a vehicle, a mobile device, and/or the like, may communicate through the SCMS infrastructure 103.

In SCMS, each device 102a-c receives two types of certificates: an enrollment certificate, which have long expiration times and identify valid devices in the system, and multiple pseudonym certificates, each of which has a short valid period (e.g., a few days). A number C (e.g., C≥1) pseudonym certificates may be valid simultaneously. For protecting the privacy, a particular vehicle (e.g., 102a or 102b) may then frequently change the pseudonym certificate employed in their communications, thus avoiding tracking by nearby vehicles or by roadside units. In some implementations, the number of pseudonym certificates C is usually limited to a small number to avoid "sybil-like" attacks, in which one vehicle poses as a platoon aiming to get some advantage over the system. For example, such a fake platoon could end up receiving preferential treatment from traffic lights programmed to give higher priority to congested roads.

SCMS is configured to allow the distribution of multiple pseudonym certificates to vehicles 102a-c in an efficient manner, while providing mechanisms for easily revoking them in case of misbehavior by their owners. As shown in FIG. 1, the SCMS infrastructure 103 includes a Pseudonym Certificate Authority (PCA) 105 that is responsible for issuing pseudonym certificates to devices 102a-c. Registration Authority (RA) 108 receives and validates requests for batches of pseudonym certificates from devices 102a-c via the location obscurer proxy 112, which are identified by their enrollment certificates. Those requests are individually forwarded to the PCA 105, where requests associated with different devices are shuffled together so the PCA 105 cannot link a group of requests to the same device.

In some embodiments, the PCA 105 may include one or more distributed PCA(s), which are connected to a root certificate authority 118 via one or more intermediate certificate authority 117. The root certificate authority 118 may interface with the SCMS manager cloud 120 to receive control commands, configuration data, etc. from the manager could 120.

The SCMS infrastructure 103 further includes Linkage Authority (LA) modules, e.g., 115a-b. The LA modules 115a-b generate random-like bit-strings that are added to certificates so the certificates can be efficiently revoked (namely, multiple certificates belonging to the same device can be linked together by adding a small amount of information to certificate revocation lists (CRLs)). Although two LAs 115a-b are shown in the SCMS infrastructure 103, additional LAs may be supported.

The SCMS infrastructure 103 also includes a Misbehavior Authority (MA) 116 that is configured to identify misbehavior by devices and, whenever necessary, revokes the certificates issued to the misbehaved devices by placing their certificates into a CRL. For example, the MA 116 includes a CRL generator 116c that adds the certificates of misbehaved devices to a CRL store 122 and broadcasts the revoked certificate information through a CRL broadcast module 124.

Figure 2:
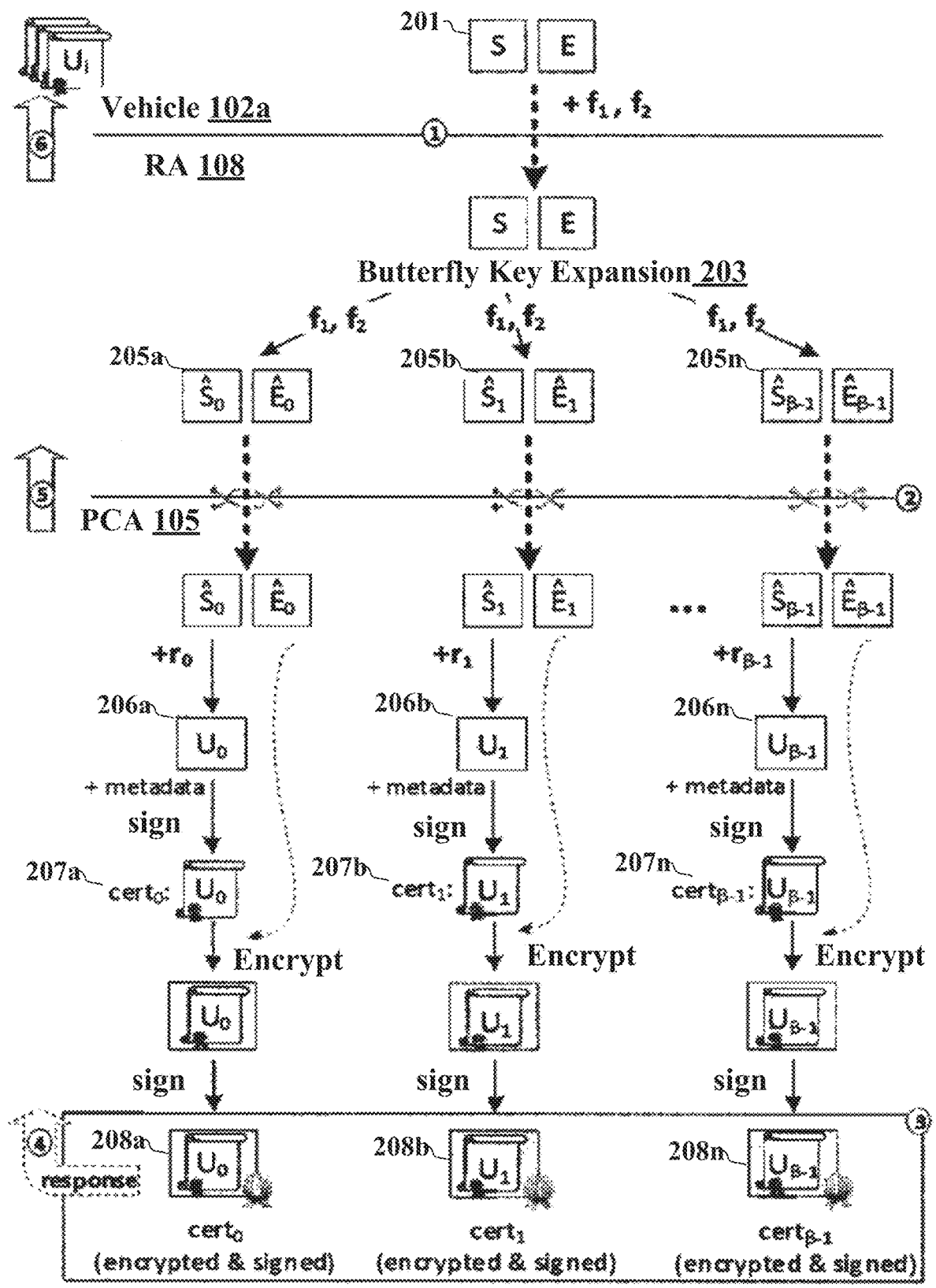
FIG. 2 provides an example diagram illustrating the butterfly key expansion in SCMS.

FIG. 2 provides an example diagram illustrating the butterfly key expansion in SCMS. The pseudonym certification provisioning process in SMCS provides an efficient mechanism for devices to obtain arbitrarily large batches of (short-lived) certificates with a small-sized request message. It comprises the following steps, as illustrated in FIG. 2.

First, the device (e.g., vehicle 102a) generates two caterpillar private/public key pairs 201, (s, S=s·G) and (e, E=e·G). The public caterpillar keys 201 S and E are then sent to the Registration Authority (RA 108) together with two suitable pseudorandom functions $f_s$ and $f_e$. The key S is employed by the RA 108 in the generation of β public cocoon signature keys $\hat{S}_i=f_s(i)·G$, where $0≤i<β$ for an arbitrary value of β; similarly, the RA 108 uses E for generating β public cocoon encryption keys $\hat{E}_i=E+f_e(i)·G$. Pairs of cocoon keys $\hat{S}_i$, $\hat{E}_i$ 205a-n generated through the butterfly key expansion process 203, from different devices are then shuffled together by the RA 108 and sent in batch to the PCA 105 for the generation of the corresponding pseudonym certificates.

After receiving the cocoon keys, the PCA 105 computes the device's public signature key 206a-n as $U_i=\hat{S}_i+r_i·G$, for a random value $r_i$, inserts $U_i$ into a certificate $cert_i$ containing any necessary metadata, and digitally signs this certificate. The signed certificate 207a-n, together with the value of $r_i$ is then encrypted using $\hat{E}_i$, so only the original device can decrypt the result to learn $U_i$ and compute the corresponding private signature key $u_i=s+r_i+f_s(i)$.

The encrypted data is also signed by the PCA 105 using its own private signature key, aiming to prevent an "honest-but-curious" RA 108 from engaging in a Man-in-the-Middle (MitM) attack. Namely, without this signature, a MitM attack by the RA 108 could be performed as follows: (1) instead of $\hat{E}_i$, the RA 108 sends to the PCA 105 a fake cocoon encryption key $\hat{E}_i^*=z·G$, for an arbitrary value of z; (2) the RA 108 decrypts the PCA's response using z, learning the value of $U_i$; and (3) the RA 108 re-encrypts the certificate with the correct $\hat{E}_i$, sending the result to the device, which proceeds with the protocol as usual. As long as the device verifies the PCA's signature on the RA's response, however, the attack would fail because RA 108 would not be able to provide a valid signature for the re-encrypted certificate 208a-n using the private signature key by PCA 105.

The user's privacy is protected in this process as long as the RA 108 and PCA 105 do not collude. After all, the shuffling of public cocoon keys 205a-n performed by the RA 108 prevents the PCA 105 from learning whether or not a group of keys in the batch belong to a same device. Unlinkability of public keys towards the RA 108, in turn, is also obtained because the latter does not learn the value of $U_i$, randomized by the PCA 105 using The butterfly key expansion process shown in FIG. 2 is generally quite efficient, but sometimes may consume significant processing resource and bandwidth, especially when implemented with the SMCS system shown in FIG. 1.

Figure 3:
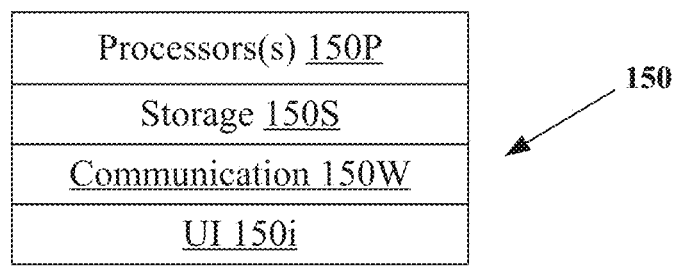
FIG. 3 illustrates an embodiment of a computing device 150 which is used by any of the entities shown in FIG. 1, according to some embodiments.

FIG. 3 illustrates an embodiment of a computing device 150 which is used by any of the entities shown in FIG. 1, according to some embodiments. For example, the computing device 150 may be housed within the vehicle 102a-b, the PCA 105, the RA 108, etc.

As shown in FIG. 3, computing device 150 includes one or more computer processors 150P coupled to computer storage (memory) 150S, and wireless communication equipment 150W for radio communications. Operation of computing device 150 is controlled by processor 150P, which may be implemented as one or more central processing units, multi-core processors, microprocessors, microcontrollers, digital signal processors, field programmable gate arrays (FPGAs), application specific integrated circuits (ASICs), graphics processing units (GPUs), tensor processing units (TPUs), and/or the like in computing device 150P.

Memory 150S may be used to store software executed by computing device 150 and/or one or more data structures used during operation of computing device 150. Memory 150S may include one or more types of machine-readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, EEPROM, FLASH-EPROM, any other memory chip or cartridge, and/or any other medium from which a processor or computer is adapted to read.

Processor 150P and/or memory 150S may be arranged in any suitable physical arrangement. In some embodiments, processor 150P and/or memory 150S may be implemented on a same board, in a same package (e.g., system-in-package), on a same chip (e.g., system-on-chip), and/or the like. In some embodiments, processor 150P and/or memory 150S may include distributed, virtualized, and/or containerized computing resources. Consistent with such embodiments, processor 150P and/or memory 150S may be located in one or more data centers and/or cloud computing facilities. In some examples, memory 150S may include non-transitory, tangible, machine readable media that includes executable code that when run by one or more processors (e.g., processor 150P) may cause the computing device 150, alone or in conjunction with other computing devices in the environment, to perform any of the methods described further herein Computing device or equipment 150 may include user interface 150i, e.g. such as present in a smartphone, an automotive information device, or of some other type device, for use by pedestrians, vehicle drivers, passengers, traffic managers, and possibly other people.

A Schnorr-Style Variant of the Implicit Protocol

In view of the need for a protocol with improved resource and bandwidth efficiency, a Schnorr-stype variant protocol is provided. FIG. 4 is an example table that compares existing explicit and implicit protocols with an implicit protocol with Schnorr-style signatures, according to embodiments described herein. The existing explicit protocol 401, the existing implicit protocol 402 and the implicit Schnorr protocol 403 employs the same process for the vehicles 102a-b to generate a public key $\hat{S}_i$ to the PCA 105 via the RA 108, as described in FIG. 2.

In all three protocols 401-403, the vehicle 102a starts by picking a random caterpillar private key s and computing the corresponding caterpillar public key S=s·G. The vehicle 102a then sends S, together with a pseudorandom instance f, to the RA 108.

In response to the vehicle's request, the RA 108 expands the caterpillar public key S into β cocoon public keys $\hat{S}_i$=S+f(i)·G. Since f is shared only among the vehicle 102a and the RA 108, the resulting cocoon keys are unlinkable to the original S from the perspective of any entity other than the vehicle 102a and the RA 108. The RA 108 then sends each individual $\hat{S}_i$ to the PCA 105, while shuffling together requests associated to different batches to ensure their unlinkability.

The PCA 105 receives, from RA 108, the cocoon public key $\hat{S}_i$ and randomizes $\hat{S}_i$ by adding $r_i$G to it, for a randomly picked $r_i$. For existing explicit certificates in protocol 401, the resulting elliptic curve point is used directly as the vehicle's butterfly public key Ui; it is then placed into a certificate together with any required metadata (e.g., a validity period), and signed. For existing implicit certificates with protocol 402, the randomized point is used as the butterfly reconstruction credential Vi; it is also combined with some metadata, and then signed. In all cases for protocols 401-403, the resulting certificate is encrypted with the originally provided $\hat{S}_i$ and sent back to the RA 108. The RA 108, unable to decrypt the PCA's response pkg, simply forwards it back to the requesting vehicle 102a, in batch.

Finally, the vehicle 102a computes the key $\hat{s}_i$=s+f(i) for decrypting pkg. It then verifies that the retrieved certificate is indeed valid. This is done either by checking its signature (for explicit certificates) or by performing the corresponding key verification process (for implicit certificates). As long as such verification is successful, the keys obtained can be used for signing messages sent to other vehicles.

Specifically, at PCA 105, the implicit Schnorr protocol 403 adopts a Schnorr variant in key generation. The implicit Schnorr protocol 403 generating a hash of both the certificate and an intended verification public key, e.g., $h_i \leftarrow H$ (cert$_i$, $\mathcal{U}$), where $\mathcal{U}$ denotes the public keys and cert$_i$ denotes certificates. The previous schemes 401 and 402 only hash certificates and metadata (presumably, vehicle signatures only include messages and possibly metadata as well). Thus, by including the intended verification public key $\mathcal{U}$ in the hash, the implicit Schnorr protocol 403 is able to thwart attacks against several keys at once. This effective measure may be implemented for all signatures (not only those of certificates, but future ones generated and verified by vehicles using their certified keys) to improve robustness of the public keys. PCA 105 then generates a signature based at least in part on the hash and a private key u, encrypts the certificate and the signature with the public key, and sends the encrypted certificate and signature to the device.

In some embodiments, the implicit Schnorr protocol 403 further provides implicit private key recovering at the vehicle 102a. The old implicit private key recovering equation used in the existing implicit protocol 402, e.g., $u_i \leftarrow h_i \hat{s}_i$+sig$_i$, involves a modular multiplication. Instead, in the implicit Schnorr protocol 403, at the vehicle 102a, private key recovering is implemented via $u_i \leftarrow \hat{s}_i$+sig$_i$, which only involves a modular addition. In this way, the implicit Schnorr protocol 403 can implement private key recovering in a fast and more efficient manner to defend against side channel leaks without loss of efficiency, and the implementation structure matches the corresponding computation that has been used the explicit protocol 401.

In some embodiments, the implicit Schnorr protocol 403 adopts implicit private key verification. In the existing implicit scheme 402, while other vehicles implicitly trust the PCA 105 by mixing its public key $\mathcal{U}$ with the received key $V_i$ and the hashed certificate $h_i$, the signing vehicle itself performs no verification at all of the received encrypted certificate, e.g., $U_i \leftarrow h_i \cdot V_i + \mathcal{U}$. This might be a point of protocol security failure. To prevent the potential protocol security failure, the implicit Schnorr protocol 403 adopts a mechanism in which the received key element $s_i g_i$ is formally similar to a signature element. For example, in the existing implicit scheme 402, the vehicle 102a-b can verify the received certificate (and hence its private key) by checking that $s_i g_i \cdot G = h_i \cdot (V_i - \hat{S}_i) + \mathcal{U}$. In the implicit Schnorr protocol 403, the vehicle 102a-b does it by checking that $s_i g_i \cdot G = V_i - \hat{S}_i + h_i \cdot \mathcal{U}$. Although the private key recovering in the implicit Schnorr protocol 403 may incur either a full-length (old scheme) or half-length (new scheme) multiplication by scalar, such private key recovering scheme may be used as a security measure against potential threats that have not been previously addressed by existing protocols.

In some embodiments, the implicit Schnorr protocol 403 implicit public key recovering. The existing implicit protocol 402 adopts a public key recovering equation, $U_i \leftarrow h_i \cdot V_i + \mathcal{U}$, which involves a multiplication by scalar where the curve point is different for each vehicle. No optimization opportunities are clear in this approach for a generic choice of the underlying elliptic curve. The implicit Schnorr protocol 403 adopts a public key recovering equation as $U_i \leftarrow V_i + h_i \cdot \mathcal{U}$, which involves a multiplication by scalar where the curve point (namely, the PCA public key $\mathcal{U}$) is one and the same for all vehicles, so that dedicated code and precomputation could be adopted to speed up the recovering operation. For instance, if the scalars are 256 bits long and written in hex, namely $h_i = h_{i,63} \cdot 16^{63} + h_{i,62} \cdot 16^{62} + \ldots + h_{i,1} \cdot 16 + h_{i,0}$ with $0 \leq h_{i,p} < 16$ for all $0 \leq p < 64$, by precomputing and storing a single, fixed 64×16 table T[p][d]:=(d·16$^p$)· $\mathcal{U}$ one could implement the computation of $$h_i \cdot \mathcal{U} = (h_{i,63} \cdot 16^{63} + h_{i,62} \cdot 16^{62} + \ldots + h_{i,1} \cdot 16 + h_{i,0}) \cdot \mathcal{U}$$
$$= (h_{i,63} \cdot 16^{63}) \cdot \mathcal{U} + (h_{i,62} \cdot 16^{62}) \cdot \mathcal{U} + \ldots +$$
$$(h_{i,1} \cdot 16) \cdot \mathcal{U} + (h_{i,0}) \cdot \mathcal{U}$$
$$= T[63][h_{i,63}] + T[62][h_{i,62}] + \ldots + T[1][h_{i,1}] + T[0][h_{i,0}]$$

at a fixed cost of only 63 point additions (rather than 255 point doublings plus an average of 85 further point additions, even if a non-adjacent form (NAF) is adopted). In this way, the implicit public key recovering mechanism provided by the implicit Schnorr protocol 403 can be about 3 to 4 times faster than a plain arithmetic mechanism.

It is worth noting that an isochronous implementation may not be necessary for the public key recovering operation described above, as all quantities involving $h_i$ and $\mathcal{U}$ are public. The fixed, shared precomputed table occupies exactly 32 KB at the classical 128-bit security level with 256-bit keys.

In some embodiments, the implicit Schnorr protocol 403 adopts implicit PCA signing. The implicit PCA signing equation adopted by the existing implicit protocol 402, e.g., $sig_i \leftarrow h_i r_i + u$, involves a modular multiplication where both factors are different for each vehicle. No optimization opportunities are clear in this approach. Instead, the implicit Schnorr protocol 403 adopts a PCA signing equation $sig_i \leftarrow r_i + h_i u$, which involves a modular multiplication where one of the factors (namely, the PCA private key u) is one and the same for all vehicles, so that a similar precomputed table lookup technique as above can be adopted to speed up certificate generation.

In this case, however, because the fixed factor is private, one needs to adopt an isochronous approach as shown in Table 1, e.g., $P[p][d] := (d \cdot 16^p) \cdot u$ is defined for the p-th step, which would involve an isochronous sequential search for the proper hex digit $h_{i,p}$ among the 16 possibilities $P[p][0 \ldots 15]$ and subsequently a modular addition is integrated into the accumulator (the modular reduction can even be postponed until the end, since the sum of 64 values will be no more than 256+6 bits long).

TABLE 1

Isochronous Table Lookup
Algorithm 1 Isochronous table lookup

INPUT: P[0...63][0...15], 0 ≤ p < 64, 0 ≤ d < 16.
OUTPUT: P[p][d] in isochronous fashion.
1:    t ← 0
2:    for e ∈ [0...15] do
>>  Assuming d and e are b-bit signed integers and that shifts are signed as well:
3:        m ← ((e − d) >> (b − 1)) | ((d − e) >> (b − 1))
4:        t ← (t & m) | (P[p][e] & ~m)
5:    end for
6:    return t Schnorr Variants In some embodiments, if a Schnorr-style scheme at the λ-bit security level is used for all signatures, so that modular integers are 2λ bits long (full-length), but hash values can be only λ bits long (half-length), because the Schnorr-style signatures only require preimage resistance. Here, it is assumed that the signature scheme hashes the intended verification key together with the nonce and the metadata or message.

Let L denote the cost of one full-length multiplication by scalar. Here the costs of hashing or performing a simple point addition may be ignored, as they tend to be much smaller than the other involved costs (for instance, the cost of one point addition is roughly only a fraction 1/(2λ) of L, which is small at practical security levels). The most common form of a Schnorr-style signature for a message µ under a key pair (s, U←s·G) is (h, z), corresponding to a signing process where the signer samples a pseudo-random integer k and computes R←k·G, h← $\mathcal{H}$(R,U,µ), and z←k−hs. Other forms of the Schnorr-style signature are also possible, e.g., a security equivalent and interchangeable form is (R, z), whereby verification consists of computing h← $\mathcal{H}$(R, U, µ) and checking whether R=z·G+h·U.

Implicit Vs. Explicit Protocols

In some embodiments, if the PCA 105 issues a key pair (u, $\mathcal{U}$ ←u·G), an example scenario of use of vehicular keys may include: vehicle A (e.g., 102a) signs some message $m_i$ using its private key $u_i$ and sends it to vehicle B (e.g., 102b) together with the certificate $cert_i$ from which the public key $U_i = u_i \cdot G$ can be extracted (explicit variant) or inferred (implicit variant), and then used to verify the signed message. The certificate cert-prepared by the PCA 105, contains either $U_i$ itself and a signature $(h_i, \zeta_i)$ such that $h_i = \mathcal{H}(\zeta_i \cdot G + h_i \cdot \mathcal{U}, \mathcal{U}, \{U_i, \text{meta}\})$ in the explicit variant, or else a point $V_i$ such that $U_i = V_i + \mathcal{H}(V_i, U, \text{meta}) \cdot \mathcal{U}$ in the implicit variant. To sign $m_i$ under $(u_i, U_i)$, vehicle A samples a pseudo-random integer $k_i$, computes $\hbar_i \leftarrow \mathcal{H}(k_i \cdot G, U_i, m_i)$, and $z_i \leftarrow k_i - \hbar_{ui}$, assembles the signature $(\hbar_i, z_i)$. Afterwards, vehicle B verifies the signed message by checking that $\hbar_i = \mathcal{H}(z_i \cdot G + \hbar_i \cdot U_i, U_i, m_i)$.

Relative Efficiency

As described above, the implicit form may have an efficiency advantage over the explicit form. Indeed, recovering the implicitly verified key $U_i$ requires only a half-length multiplication by scalar, while an explicitly verified key incurs one full-length and one half-length multiplications. This may be true if the explicit form adopts the more common (h, z) signature form. However, if the alternative form (R, z) is adopted instead, the implicit form may not appear to have a significant advantage.

Specifically, upon receiving an implicit certificate $cert_i$ together with a message $m_i$ signed as $(h_i, z_i)$, vehicle B must recover $U_i = V_i + \mathcal{H}(V_i, \mathcal{H}, \text{meta}) \cdot \mathcal{U}$ at the cost L/2 of a half-length multiplication by scalar, then verify the signature on $m_i$ by checking that $\hbar_i = \mathcal{H}(z_i \cdot G + h_i \cdot U_i, U_i, m_i)$ at the cost of a full-length multiplication by scalar and a half-length multiplication by scalar, or roughly 3L/2. Therefore, the combined cost is 2L. This cost does not change whichever alternative signature form, e.g., (h, z) or (R, z), is adopted.

By comparison, with signatures in the alternative form (R, z), upon receiving an explicit certificate $cert_i$ signed as $(T_i, \zeta_i)$ by the PCA 105, together with a message $m_i$ signed as $(R_i, z_i)$ by A, vehicle B can verify the certificate and the signed message in batch, by computing $h_i \leftarrow \mathcal{H}(T_i, \mathcal{U}, \{U_i, \text{meta}\})$, $\hbar_i \leftarrow \mathcal{H}(R_i, U_i, m_i)$, and checking whether $T_i + R_i = (\zeta_i + z_i) \cdot G + h_i \cdot \mathcal{U} + \hbar_i \cdot U_i$ at a cost of a full-length multiplication by scalar and two half-length multiplications by scalar, or roughly 2L. This is essentially the same cost as the implicit variant.

Therefore, the implicit variant and the explicit form may achieve comparable processing efficiency (with the implicit variant may possess a marginal advantage when (h, z) is used). It is worth noting that this assessment is not affected by the availability of table-based implementations as suggested previously: both the implicit and the explicit forms would benefit equally from it, and the overall cost would decrease to (3/2+ε)L if the actual cost of computing $h_i \cdot \mathcal{U}$ were only εL (0<ε<<1) rather than L/2.

Attacking and Defending Batch Verification

In General, Batch Verification is Usually Deployed with Care to Prevent Attacks. The implicit Schnorr protocol 403, however, contains a butterfly protocol that automatically protects against such attacks. For example, the attacks on multisignatures as proposed by M. Bellare and G. Neven (discussed in "Multisignatures in the Plain Public-Key Model and a General Forking Lemma." Proceedings of the 13th ACM Conference on Computer and Communications Security (CCS 2006), pp. 390-399, 2006, DOI: 10.1145/1180405.1180453) do not necessarily affect the implicit Schnorr protocol 403. The reason is that the very countermeasure adopted in the aforementioned Bellare-Neven work, namely multiplying each involved public key by a different hash, is already embedded in the scheme definition of the implicit Schnorr protocol 403 (more precisely, the signatures here never cease to be individual rather than collective). In addition, naive multisignatures require the same hash value to be signed by all participants, and the Bellare-Neven scheme thwarts it by forcing independent hash values to be signed. In the implicit Schnorr protocol 403, the hash values are naturally different to begin with, only the verification process is expedited by the batch mechanism.

The Key Faking Attack

If U is a genuine public key and an attacker is allowed to pick their public key U' at will, the attacker can mount the following attack. The attacker's goal is to come up with fake signatures (R, z) for a message m and (R', z') for a message m' that will likely not verify separately (nor are they required to), e.g., most likely $R \neq z \cdot G + \mathcal{H}(R, U, m) \cdot U$ and $R' \neq z' \cdot G + \mathcal{H}(R', U', m') \cdot U'$, but that do verify in batch, i.e. $R+R'=(z+z') \cdot G + \mathcal{H}(R, U, m) \cdot U + \mathcal{H}(R', U', m') \cdot U'$. To attain that attack goal, the attacker chooses points R and R' and integers z and z' uniformly at random, and messages m and m' at will. Then the attacker defines $U':=\mathcal{H}(R', U', m')^{-1} \cdot (R+R' \cdot (z+z') \cdot G - \mathcal{H}(R, U, m) \cdot U)$ as the public key.

Attack Failure Against Butterflies

Such key faking attack, however, does not work against the butterfly protocol. One aspect of the butterfly protocols is that the PCA 105 only ever signs the vehicle's public keys. Therefore, the above attack is only meaningful for $U = \mathcal{U}$ when m=U' and the attacker, who is not a genuine participant vehicle in the system, intends to convince other vehicles otherwise by sending them fake certificates and messages that would verify in batch. But in that case the attack equation becomes $U'=\mathcal{H}(R', U', m')^{-1} \cdot (R+R'-(z+z') \cdot G - \mathcal{H}(R, \mathcal{U}, U') \cdot \mathcal{U})$, whereby U' must be provided beforehand as part of its own definition. Thus, the choice of a public key is no longer free as required by the attacker, which therefore thwarts the attack.

Similar attack variants may fail in a similar way, as there is generally no way other quantities in the attack equation could be chosen as a function of the others: of all curve points involved, G and U are given and cannot be changed; the other two points, R and R', both appear as inputs and outputs of hash functions in the same fashion as U'; and finally, the two integers z and z' are only extractible from the equation by directly solving an instance of the discrete logarithm problem.

In general, the key faking attack may fail for batch verification of a hierarchy of keys, but potentially may apply when all involved keys are at the same level.

Hierarchical Batch Verification Security

However, if the butterfly protocol with variant Schnorr-style signatures are insecure with regard to hierarchical batch verification, then the attacker would be able to solve the discrete logarithm problem to extract the two integers z and z'. Specifically, the attacker would be able to retrieve the PCA's private key from G and the corresponding public key U alone.

Indeed, if the attacker, when given G and $\mathcal{U}$, could come up with a public key U' and two pairs (R, z) and (R', z') satisfying the batch verification equation $R+R'=(z+z') \cdot G + \mathcal{H}(R, \mathcal{U}, U') \cdot \mathcal{U} + \mathcal{H}(R', U', m') \cdot U'$, they could apply the Pointcheval-Stern technique of running the same Turing machine that describes this process with the same randomness input but different hash oracles and end up with three such equations for the same fake signatures (under three different hash oracles). Thus, even if the attacker did not know the discrete logarithms of R+R' and U' (let alone that of $\mathcal{U}$) to the base G, in the end the attacker may get a determinate linear system in those three unknowns, and thus recover the private key corresponding to $\mathcal{U}$.

Post-Quantum Butterfly Key Expansion for Vehicular Communications

In some embodiments, the Elliptic-curve cryptography (ECC) based protocols may be extended to quantum-resistant schemes as long as those schemes support both encryption and signatures under the same key pair. For example, in all schemes, the PCA 105 encrypts the certificate under $\hat{S}_i$, which apart from an offset $(r_i \cdot G)$, is functionally the same key $U_i = u_i \cdot G$ that will be later used to verify signatures. This requires the encryption and signing key pairs to have the same algebraic/combinatorial nature. However, while this is possible in the ECC setting, such scheme precludes most post-quantum candidate cryptosystems. Specifically, it precludes hash-based schemes (which only support signatures), multivariate schemes (which mostly support signatures, while encryption/key encapsulation mechanism (KEM) are much less scrutinized for security and require entirely different algorithms and parameters), code-based and isogeny-based schemes (which mostly support encryption/KEM, while signatures are very hard to obtain, inefficient when available, and require entirely different parameters). However, in general it does not preclude lattice-based cryptosystems, in particular those schemes that rely on the Ring-learn-with-errors (RLWE) assumption (specifically where keys have the form $U_i \leftarrow u_i \cdot G + w_i$ for short private vectors u, and w sampled from a suitable distribution and G is a uniformly random public vector), as both encryption and signature schemes are known to differ in much less disparate ways than in other families of post-quantum proposals. Therefore, with a proper choice of algorithms and, above all, distributions and parameters, it is possible to attain the same functionality with post-quantum protocols with the ECC protocols.

In some embodiments, blind transference of LWE samples can be used for RLWE version of post-quantum protocols, which provides the possibility of blind transferences of elliptic curve points. In the post-quantum setting, it depends on the existence of an RLWE-based encryption (more precisely, key encapsulation) scheme and a digital signature scheme that can sport additively homomorphic keys, share the same key pair for their individual operations, and are similarly secure for the same set of distributions and parameters. Specifically, the sum of two private keys (u, w) and (u', w') is still an algebraically admissible private key (u", w")=(u+u', w+w'). The sum U"=U+U' of the corresponding public keys U and U' is still an algebraically admissible public key and is so the same key that naturally corresponds to the sum of public keys. This can be achieved, for instance, when the keys have the form U=u·G+w and U'=u'·G+w', whereby U"=U+U'=u·G+w+u'·G+w'=(u+u')·G+(w+w')=u"·G+w".

In some embodiments, a lattice-based analogue of the ECC-based explicit protocol can be achieved, e.g., with (a minor variant of) the qTESLA digital signature scheme and the Lyubashevsky-Peikert-Regev (LPR) key encapsulation scheme further described below in relation to FIGS. 5A-5B. It is worth noting that any digital signature scheme and key encapsulation scheme that is purely based on RLWE or LWE would work with the post-quantum butterfly key expansion discussed throughout this disclosure.

Figure 5A:
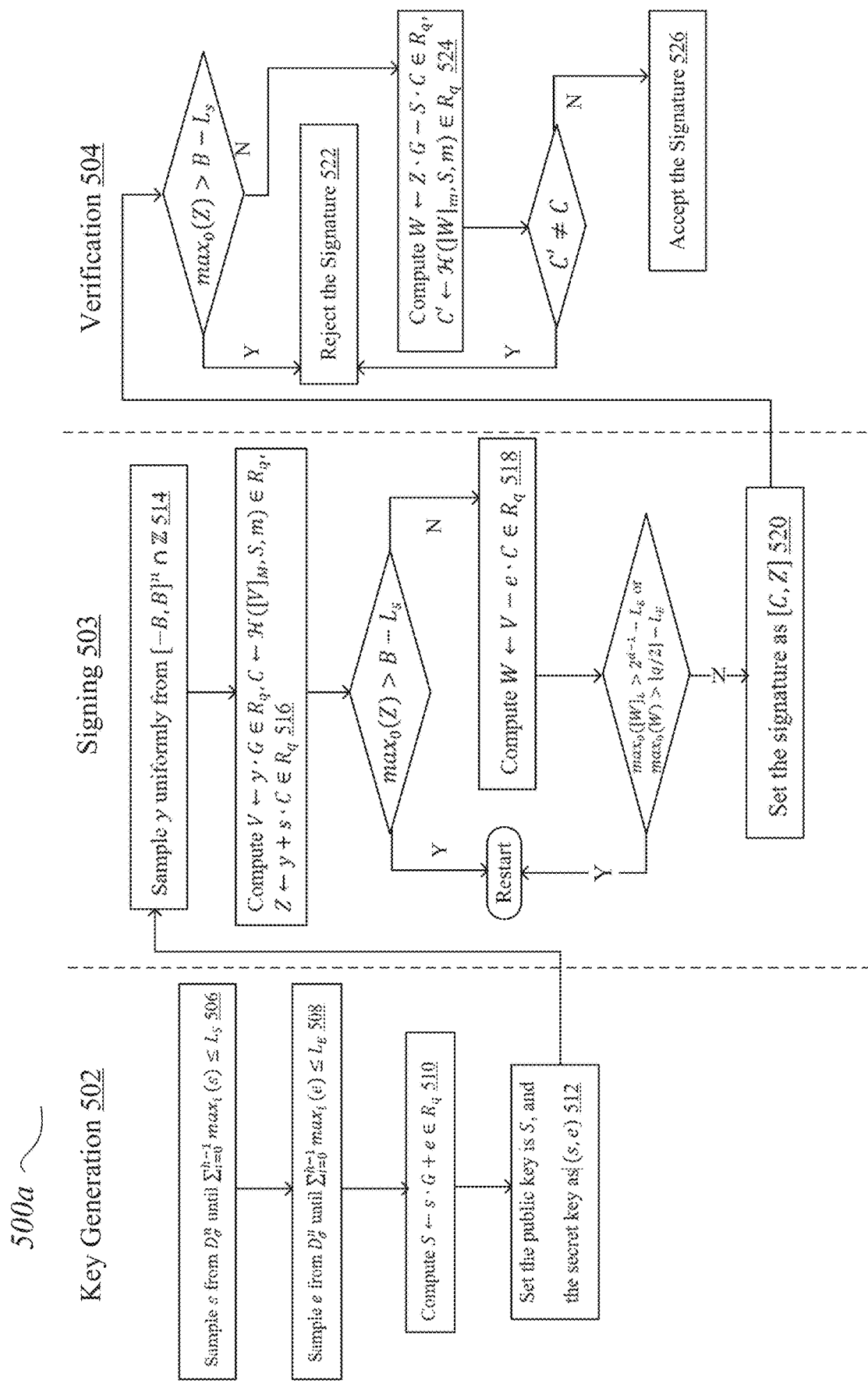
FIG. 5A provides an example logic flow diagram illustrating an example RLWE-based component scheme for the use of butterfly effect protocols, known as the qTESLA digital signature scheme, according to some embodiments.

FIG. 5A provides an example logic flow diagram illustrating an example RLWE-based component scheme 500a for the use of butterfly effect protocols, known as the qTESLA digital signature scheme, according to some embodiments. Let π be a permutation that sorts the components of a ring element u in decreasing order of their absolute magnitudes, i.e. $|u_{\pi(0)}| \leq \ldots \leq |u_{\pi(n-1)}|$. In what follows, $\max_i(u)$ denotes the i-th largest component of u in absolute value, that is, $\max_i(u)=u_{\pi(i)}$. Furthermore, for any integer c and for a given parameter d, $[c]_L$ denotes the unique integer in $(-2^{d-1}, 2^{d-1}] \cap \mathbb{Z}$ such that $c \propto [C]_L \mod 2^d$ (i.e. the centered d least significant bits of c) and $[c]_M$ denotes the value $(c-[c]_L)/2^d$ (i.e. the corresponding centered most significant bits of c, with $[u]_L$ and $u_M$ denoting the application of these operations to all coefficients of u.

The qTESLA digital signature scheme 500a starts at process 502, where a vehicle (e.g., 102a) computes key generation with the parameters n, q, π, h, $L_S$, $L_E$, G, where n denotes the dimension of the key; π denotes a permutation that sorts the components of a ring element u in decreasing order of their absolute magnitudes q denotes a prime number; $L_S$ and $L_E$ are the chosen the qTESLA parameters that bound the random sampling; and G denotes a uniformly sampled ring element. Specifically, at sub-process 506, s is sampled from $D_\sigma^n$ until $\Sigma_{i=0}^{h-1} \max_i(s) \leq L_S$. At sub-process 508, e is sampled from $D_\sigma^n$ until $\Sigma_{i=0}^{h-1} \max_i(e) \leq L_E$. At sub-process 510, the scheme computes $S \leftarrow s \cdot G + e \in R_q$. At sub-process 512, the vehicle sets the public key as S, and the secret key as (s, e).

At process 503, PCA 105 signs with parameters n, q, B, $L_s$, d, G, s, e, S, $m \in \{0,1\}^n$. Specifically, at sub-process 514, parameter y is sampled uniformly from $[-B, B]^n \cap \mathbb{Z}$. At sub-process 516, PCA computes $V \leftarrow y \cdot G \in R_q$, $C \leftarrow \mathcal{U}([V]_M, S, m) \in R_q$, $Z \leftarrow y + s \cdot C \in R_q$. Next, if $\max_0(Z) > B - L_s$, scheme 500a restarts. Otherwise, scheme 500a proceeds to sub-process 518 to compute $W \leftarrow V - e \cdot C \in R_q$ at sub-process 518. If $\max_0([W]_L) > 2^{d-1} - L_E$ or $\max_0(W) > \lfloor q/2 \rfloor - L_E$, the scheme 500a restarts. Otherwise, scheme 500a generates signature as [C, Z] (C is usually represented as a short raw hash value) at subprocess 520.

At process 504, the vehicle verifies the signatures with parameters n, q, B, $L_s$, d, S, [C, Z], $m \in \{0,1\}^n$. Specifically, if $\max_0(Z) > B - L_s$, the vehicle rejects the signature at 522. Otherwise, the scheme 500a proceeds to sub-process 524 to compute $W \leftarrow Z \cdot G - S \cdot C \in R_q$, $C' \leftarrow \mathcal{U}([W]_m, S, m) \in R_q$. Next, if $C' \neq C$, the vehicle rejects the signature at 522, otherwise the vehicle accepts the signature at 526.

Figure 5B:
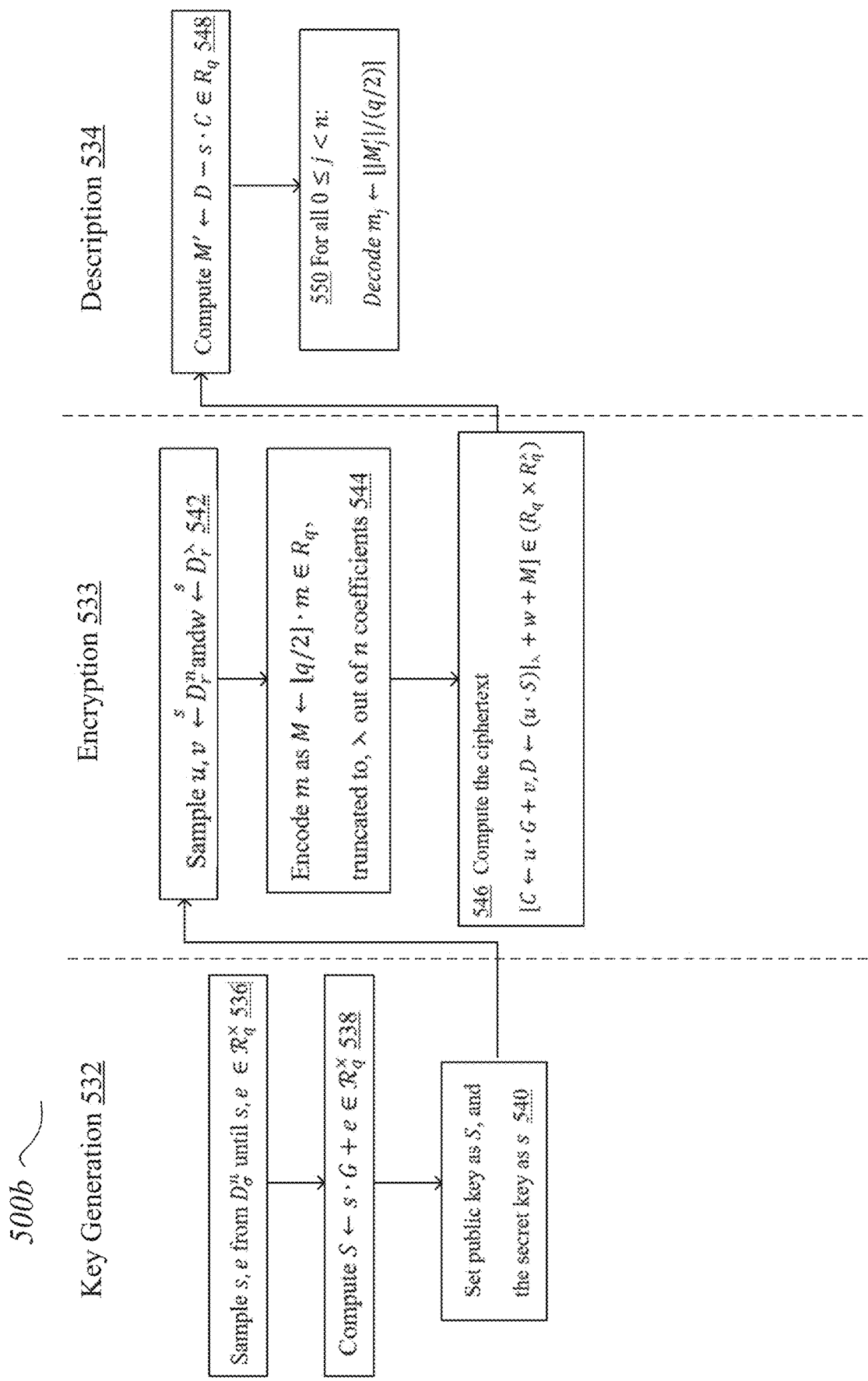
FIG. 5B provides an example logic flow diagram illustrating an example RLWE-based component scheme for the use of butterfly effect protocols, known as the Lyubashevsky-Peikert-Regev (LPR) digital signature scheme, according to some embodiments.

FIG. 5B provides an example logic flow diagram illustrating an example RLWE-based component scheme 500b for the use of butterfly effect protocols, known as the Lyubashevsky-Peikert-Regev (LPR) digital signature scheme, according to some embodiments. The LPR scheme is a variant of the Gentry-Peikert-Vaikuntanathan (GPV) dual scheme (discussed in C. Gentry, C. Peikert, and V. Vaikuntanathan. "Trapdoors for hard lattices and new cryptographic constructions". STOC 2008, pp. 197-206, 2008, which is hereby expressly incorporated by reference herein in its entirety), which in turn is a dual variant of the original Regev cryptosystem (discussed in O. Regev. "On lattices, learning with errors, random linear codes, and cryptography." STOC 2005, pp. 84-93, 2005, which is hereby expressly incorporated by reference herein in its entirety). One of the differences is that, in LPR, both the public key and the encryption nonce are (R)LWE samples, while in GPV and Regev either the nonce or the public key are syndromes of an (R)LWE sample.

In what follows, $n \in \mathbb{N}$ is the lattice dimension, $q \in \mathbb{N}$ is a prime, σ and r are suitable distribution parameters, and $G \in R_q^\times$ is a uniformly sampled ring element (which is shared among the users in the present scenario, but elsewhere could be individually chosen as part of the public key). The encryption base G naturally corresponds to the signing base G and hence both are represented with the same notation. Here, uppercase letters are used to denote long, uniformly random ring elements, and lowercase letters are used to denote short ring elements.

At process 532, the vehicle (e.g., 102a) performs key generation using parameters (n, q, G). Specifically, at sub-process 536, the vehicle samples s, e from $D_\sigma^n$ until s, $e \in \mathcal{R}_q^\times$. At subprocess 538, the vehicle computes $S \leftarrow s \cdot G + e \in \mathcal{R}_q^n$. At sub-process 540, the vehicle sets the public key as S, and the secret key as s. Here, the e component remains secret but is not further used.

At process 533, the PCA (e.g., 105) performs encryption based on parameters (n, q, r, G, S, $m \in \{0,1\}^\lambda$), where λ denotes the encryption length. Specifically, at sub-process 542, the PCA samples u, $$v \stackrel{\$}{\leftarrow} D_r^n \text{ and } w \stackrel{\$}{\leftarrow} D_r^\lambda.$$

At sup-process 544, the PCA encodes m as $M \leftarrow \lfloor q/2 \rfloor \cdot m \in R_q$, truncated to, λ out of n coefficients. At sub-process 546, the PCA computes the ciphertext $[C \leftarrow u \cdot G + v, D \leftarrow (u \cdot S)|_\lambda + w + M] \in (R_q \times R_q^\lambda)$.

At process 534, the vehicle decrypts the cipher text based on (n, q, s, [C, D]). Specifically, at sub-process 548 the vehicle computes $M' \leftarrow D - s \cdot C \in R_q$. At sub-process 550, for all $0 \leq j < n$, the vehicle decodes $m_j \leftarrow \lfloor |M_j'|/(q/2) \rfloor$.

Here, $M' = D - s \cdot C = u \cdot S + w + M - s \cdot (u \cdot G + v) = u \cdot (s \cdot G + e) + w + M - s \cdot u \cdot G - s \cdot v = u \cdot s \cdot G + u \cdot e + w + M - u \cdot s \cdot G - s \cdot v = M + (u \cdot e - s \cdot v + w)$. Thus the decryption will be correct as long as $u \cdot e - s \cdot v + w$ is within the error threshold of decoding, i.e. $|(u \cdot e - s \cdot v + w)_j| \leq \lfloor q/4 \rfloor$ for all $0 \leq j < \lambda$. If m is less than n bits long (as it typically indeed is, since it stands for an ephemeral symmetric key at the desired security level, e.g. only, λ=128 bits long as compared to n=1024, or λ=256 bits long as compared to n=2048, the D component of the cryptogram (or a capsule in a KEM) can be restricted to its first λ bits, thereby considerably reducing bandwidth occupation and slightly speeding up both encryption and decryption.

The RLWE-based component schemes described in FIGS. 5A-5B provide a post-quantum secure approach for issuing multiple pseudonym certificates from a small piece of information, while traditionally most encryption schemes are vulnerable to post-quantum attacks (e.g., in a traditional SCMS). Thus, the RLWE-based component schemes described in FIGS. 5A-5B improves long-term security of SCMS.

Figure 6:
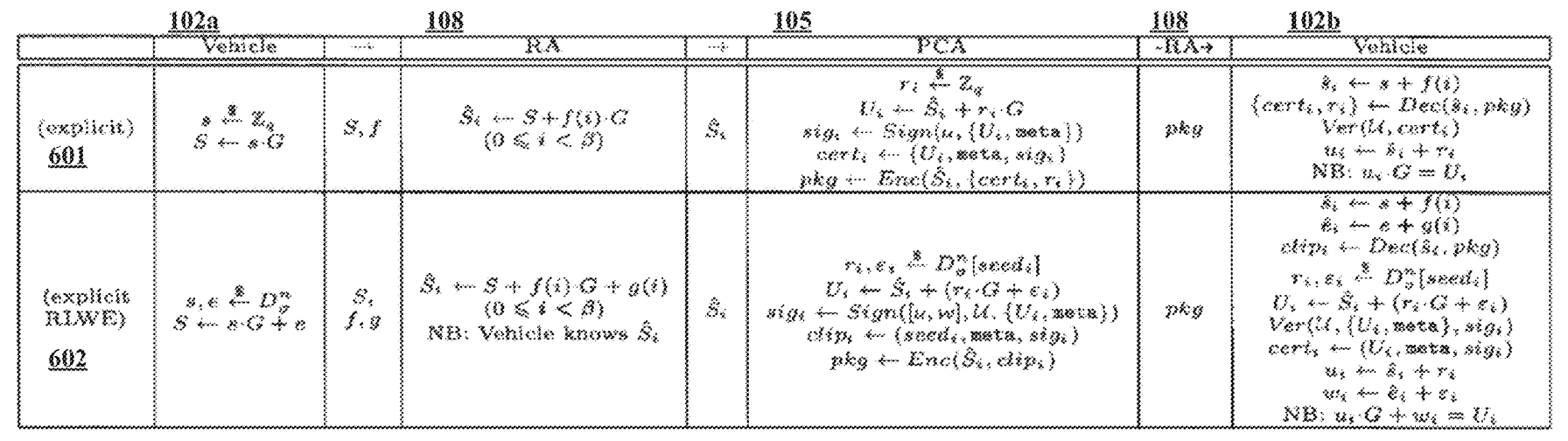

FIG. 6 provides an example table that compares the ECC-based (pre-quantum) and the lattice-based (post-quantum) variants of the explicit butterfly protocol, according to some embodiments described herein. Here, $$u \stackrel{\$}{\leftarrow} D_G^n$$

denotes me random sampling of a value u from the 0-centered discrete Gaussian distribution on $\mathbb{Z}_q^n$; with standard deviation σ. Additionally, $$u \stackrel{s}{\leftarrow} D_\sigma^n[\text{seed}]$$

denotes the pseudo-random sampling of a value u from the 0-centered discrete Gaussian distribution on $\mathbb{Z}_q^n$ with standard deviation σ, taking seed as the seed of the pseudo-random sampler.

Specifically, in the lattice-based post-quantum variants of the explicit butterfly protocol 602, the vehicle 102a starts by generating a caterpillar private/public key pair. In this case, however, the private caterpillar key has two components, the short ring elements (s and e), which are obtained by random sampling the zero-centered discrete Gaussian distribution $D_\sigma^n$ with standard deviation a. The corresponding public caterpillar key is then computed as S=s·G+e, which corresponds to a ring element following the LWE distribution and, thus, is indistinguishable from random. This public caterpillar key S is then sent to the RA 108 along with two suitable pseudo-random functions f(i) and g(i) that deterministically emulate sampling from $D_\sigma^n$ with i as seed.

The RA 108 then uses the public caterpillar key S, as well as the pseudo-random outputs from pseudo-random functions f(i) and g(i), for generating β public cocoon public keys $\hat{S}_i \leftarrow S+f(i)\cdot G+g(i)$, $0 \leq i < \beta$. Then, the RA 108 shuffles keys from different vehicles (as described in FIG. 2) and sends the batch of cocoon keys $\hat{S}_i$ to the PCA 105.

After receiving a cocoon key $\hat{S}_i$, the PCA 105 computes the vehicle's public butterfly key as $U_i \leftarrow \hat{S}_i + (r_i \cdot G + \epsilon_i)$. In this process, the randomization factors $r_i$, $$\varepsilon_i \stackrel{s}{\leftarrow} D_\sigma^n[\text{seed}]$$

are generated to prevent the RA 108 from learning the vehicle's actual butterfly key. Instead of using a single random factor $r_i$ sampled from $\mathbb{Z}_q^n$ as use in the existing explicit protocol 601, the factors $r_i$, $\varepsilon_i$ are obtained by pseudo-random sampling the zero-centered discrete Gaussian distribution with standard deviation σ, meaning that $r_i$, $\varepsilon_i$ can be recovered by the requesting vehicle as long as the requesting vehicle is provided with the pseudo-randomness source seed i.

The corresponding pseudonym certificate is then created by the PCA 105. Namely, the PCA 105 signs the vehicle's public butterfly key $U_i$, along with any required metadata (meta), using the qTESLA signature scheme described in FIG. 5A and the PCA's own private key u. The set (seed i, meta, $\text{sig}_i$) is then encrypted using $\hat{S}_i$, so only the vehicle who sent the request is able to decrypt the resulting package pkg. Subsequently, the encrypted package pkg is then sent to the RA 108, which forwards the package to the vehicle 102a.

Finally, the vehicle 102a decrypts the RA's response using the private key $\hat{s}_i \leftarrow s+f(i)$, $\hat{e}_i \leftarrow e+g(i)$, thus recovering the set (seed i, meta, $\text{sig}_i$). Here, this set does not contain the public key $U_i$ itself, but just the (more compact) seed i that enables its computation. Therefore, the vehicle 102a first computes the public key $U_i \leftarrow \hat{S}_i + (r_i \cdot G + \epsilon_i) = S + (f(i) + r_i) \cdot G + (g(i) + \varepsilon_i)$. The vehicle 102a then checks the PCA's signature $\text{sig}_i$ and, if the verification is successful, sets its i-th pseudonym certificate to $\text{cert}_i \leftarrow (U_i, \text{meta}, \text{sig}_i)$. The qTesla private signature key corresponding to $U_i$ is thus, $u_i \leftarrow \hat{s}_i + r_i$, $w_i \leftarrow \hat{e}_i + \epsilon_i$. To ensure that this private key $(u_i, w_i)$ is correct, the vehicle 102a also verifies that $u_i \cdot G + w_i = U_i$.

Blind Transference of LWE Samples

In some embodiments, the qTESLA scheme requires the private key samples to satisfy CheckS (s) and CheckE (e), meaning these conditions must hold for $u_i$ and $w_i$ as well. Yet, the PCA 105 cannot check this for the since the PCA does not know $u_i$ or $w_i$. This will force the vehicle 102b to reject the received key if it fails to pass the checks, as it might otherwise cause genuine signatures not to verify. Fortunately, it is possible to choose parameters such that the probability of key rejection is fairly low, so that instead of receiving a fixed number of keys from the PCA 105, the vehicle 102b obtains a variable amount (albeit very close to the expected value). This also compensates for the possibility of decryption failure for the LPR scheme (although this should be negligible, even though one must use qTESLA parameters and keys). In principle, this increases the chance of rejection during signing, since the probability of decryption failure grows in the opposite direction as the chance of key rejection.

To mitigate this issue, especially-tailored parameters can be constructed that keep both key and signing rejection under control. Even the actual rate of plain signature restarts (an unavoidable but predicted and controlled phenomenon that is in the nature of most if not all LWE-based signatures) was actually observed to be very close to the typical qTESLA rate (specifically, approximately 38.8% as compared to a design value of 40%).

In some embodiments, the blind transference of LWE samples may be defined through the following definitions:

Definition 1. A σ-sample is a ring element sampled from the (zero-centered) Gaussian distribution on $\mathcal{R}_q$ with parameter σ.

Let G and H be uniformly sampled from $\mathcal{R}_q$. The (R)LWE assumption for a sample of form $L \leftarrow s \cdot G + e$ (where s and e are "short" σ-samples) is that distinguishing between L and H is hard.

Definition 2. A ring element of form $L \leftarrow s \cdot G + e$, where s and e are σ-samples, will be called σ-indistinguishable (from a uniform random sample) under the (R)LWE assumption.

Here it is assumed that the (R)LWE assumption holds at the desired security level for all $\sigma \in [\sigma_0, \sqrt{k\sigma_0}]$ where $k \in \{1,2,3\}$. If so, then the vehicle's ring elements, of form $S \leftarrow s \cdot G + e$ for $\sigma_0$-samples s and e, are $\sigma_0$-indistinguishable from the point of view of the RA 108, the PCA 105, and other vehicles. The RA's ring elements, of form $\hat{S}_i \leftarrow S + f(i) \cdot G + g(i)$ for f(i), g(i) simulating $\sigma_0$-sampling, are $\sqrt{2\sigma_0}$-indistinguishable from the point of view of the PCA 105 and other vehicles (unless they too know f(i), g(i), which are supposed to be known only by the vehicle and the RA 108). This is because the RA 108 is essentially masking the $\sigma_0$-indistinguishable element S with another $\sigma_0$-indistinguishable element, yielding a ring element identical to that obtained from ring elements $\hat{s}_i \leftarrow s + f(i)$, $\hat{e}_i \leftarrow e + g(i)$, which are themselves identical to $\sqrt{2\sigma_0}$-samples by virtue of being the sum of two $\sigma_0$-samples each. The ring elements signed by the PCA 105, of form $U_i \leftarrow \hat{S}_i + (r_i \cdot G + \epsilon_i)$ for $\sigma_0$-samples $r_i$ and $\epsilon_i$, are $\sqrt{3\sigma_0}$-indistinguishable from the point of view of the RA 108 and other vehicles. This is because the PCA 105 is essentially masking the $\sqrt{2\sigma_0}$-indistinguishable element $\hat{S}_i$ with a $\sigma_0$-indistinguishable element, yielding a ring element identical to that obtained from (the vehicle's new secret) ring elements $u_i \leftarrow \hat{s}_i + r_i$, $w_i \leftarrow \hat{e}_i + \epsilon_i$, which are themselves identical to $\sqrt{3\sigma_0}$-samples by virtue of being the sum of a $\sqrt{2\sigma_0}$-sample and a $\sigma_0$-sample each.

Signature Scheme

In some embodiments, signing only requires functions f(i) and g(i) to deterministically emulate sampling from $D_\sigma^n$, with i as the seed. Accordingly, the PCA 105 must sample $r_i$ and $\epsilon_i$ from $D_\sigma^n$ and encryption will impose additional constraints on these functions.

From the RLWE assumption, S=s·G+6 is indistinguishable from uniformly random for s and e sampled with distribution parameter $\sigma$, while the $\hat{S}_i = \hat{s}_i \cdot G + \hat{e}_i$ are indistinguishable from uniformly random for $\hat{s}_i$ and $\hat{e}_i$ sampled with distribution parameter $\sqrt{2\sigma}$ by virtue of these secret components being each the sum of 2 identically parametrized Gaussian variables, namely $\hat{s}_i = s + f(i)$ and $\hat{e}_i = g(i)$, and the $U_i = u_i \cdot G + w_i$ are indistinguishable from uniformly random for $u_i$ and $w_i$ sampled with distribution parameter $\sqrt{3\sigma}$ by virtue of these secret components being each the sum of 3 such variables, namely $u_i = s + f(i) + r_i$ and $e_i = e + g(i) + \epsilon_i$. The actual scheme parameters are to be chosen to remain secure at the desired level or above for all of these distribution parameters. Furthermore, the parameters ensure that all signature operations are efficient with distribution parameter $\sqrt{3\sigma}$ (and related quantities, e.g., the qTESLA parameters $L_S$ and $L_E$), since the final certificate is equivalent to keys prepared according to this setting.

Encryption requires functions f(i) and g(i) to deterministically emulate sampling from $D_\sigma^n$, with i as the seed, until f(i), g(i)$\in \mathcal{R}_q^\times$ f(i), that is, they are both invertible. Accordingly, the PCA 105 samples $r_i, \epsilon_i$, from $D_\sigma^n$ until $r_i, \epsilon_i \in \mathcal{R}_q^\times$. Like the secret e component, the $\hat{e}_i$ and $w_i$ components need not actually be computed, nor $\epsilon_i$ kept after the certificate generation. Here, set $\bar{G} := -G$, to bridge the qTESLA and LPR notations. From the RLWE assumption, $S = e - s \cdot \bar{G}$ is indistinguishable from uniformly random for s (and e) sampled with distribution parameter $\sigma$, while the $\hat{S}_i = \hat{e}_i - \hat{s}_i \cdot \bar{G} \cdot G$ are indistinguishable from uniformly random for $\hat{s}_i$ (and $\hat{e}_i$) sampled with distribution parameter $\sqrt{2\sigma}$ by virtue of these secret components being each the sum of 2 identically parametrized Gaussian variables, namely $\hat{s}_i = s + f(i)$ (and $\hat{e}_i = s + g(i)$).

In some embodiments, encryption occurs in the scheme only under the key pair $\hat{s}_i, \hat{S}_i$ implicitly $\hat{e}_i$), so in principle the actual scheme parameters could be chosen under this premise, but the final signature key pair already forces a more stringent condition. If the final key pair is used not only for signatures but for encryption as well, then the parameters are usually double-checked (although the requirements for encryption tend to be less stringent than those for signatures, e.g. the distributions need not be as precise).

Bandwidth Requirements

In some embodiments, a public certificate $\text{cert}_i$ contains: a qTESLA public key $U_i$ of size $|U_i| = n\lceil \lg q \rceil$ bits. A general qTESLA signature would include a K-bit seed for the pseudo-random choice of the base G, but this is omitted here since the same G must be used systemwide to preserve the vehicle's anonymity. Metadata of unspecified size includes $|\text{meta}| = \mu$ bits. A qTESLA signature $\text{sig}_i$ has a size $|\text{sig}_i| = K + n(\lceil \lg(B - L_s) + 1 \rceil)|$ bits (more precisely, a hash value of size K bits and a ring element in $\mathcal{R}_q$ with 0-centered coefficients not exceeding $B - L_s$ in absolute value). Hence the bandwidth requirement of the public certificate $\text{cert}_i$ has a size of $|\text{cert}_i| = |U_i| + |\text{meta}| + |\text{sig}_i| = n\lceil \lg q \rceil + K + n(\lceil \lg(B - L_s) + 1 \rceil) + \mu$ bits.

In some embodiments, an encrypted clipped certificate pkg contains a LPR capsule [C, D] of size $|[C,D]| = |C| + |D| = (n + \lambda \lceil \lg q \rceil)$ bits (where C is the encryption nonce and D is the encapsulation of a $\lambda$-bit symmetric key), a seed $\text{seed}_i$ of size $|\text{seed}_i| = K$ bits for the blind LWE transfer, metadata of unspecified size $|\text{meta}| = \mu$ bits, a qTESLA signature $\text{sig}_i$ of size $|\text{sig}_i| = K + n(\lceil \lg(B - L_s) + 1 \rceil)$ bits, a MAC tag $r_i$ of size K bits as part of the authenticated symmetric encryption of the clipped certificate. Hence the encrypted clipped certificate pkg has a size of $|pk| = |[C, D]| + |\text{seed}_i| + |\text{meta}| + |\sigma_i| + |r_i| = (n + \lambda)\lceil \lg q \rceil + K + K + n(\lceil \lg(B - L_s) + 1 \rceil) + K + \mu$ bits.

The embodiments described above illustrate but do not limit the invention. For example, the techniques described for vehicles can be used by other mobile systems, e.g. pedestrians' smart phones or other mobile systems equipped with computer and communication systems 150. The term "vehicle" is not limited to terrestrial vehicles, but includes aircraft, boats, space ships, and maybe other types of mobile objects. The vehicle techniques can be also be used by non-mobile systems, e.g. they can be used on a computer system.

The invention is not limited to the embodiments described above. Other embodiments and variations are within the scope of the invention, as defined by the appended claims.

What is claimed is:

1. A method for providing digital certificates for use by devices in authentication operations, the method comprising: receiving, by a first entity, a cocoon public key for generating a digital certificate, wherein the cocoon public key is generated by expanding a caterpillar public key with a random function and the first entity is uninformed of which device the caterpillar public key is originated from; generating butterfly reconstruction credentials based on the cocoon public key and a random value; generating a certificate based on the butterfly reconstruction credentials and metadata; generating a hash value of both the certificate and a verification public key reserved for the first entity; generating a signature based on the random value, the hash value and a verification private key associated with the verification public key, wherein the generating the signature further comprises using an isochronous table lookup to speed up signature generation based on a fixed factor of the verification private key; encrypting the certificate and the signature using the cocoon public key; and sending an encryption package from the encrypted certificate and signature to a second entity, wherein: the second entity is unable to decrypt the encryption package, and the encryption package is forwarded from the second entity to a requesting device.

2. The method of claim 1, further comprising: sampling the random value from a multi-dimensional space; and generating the signature by adding the random value and a product of the hash value and the verification private key.

3. The method of claim 1, further comprising: performing an isochronous sequential search for a hex digit among 16 possibilities, and a modular addition into an accumulator.

4. A computing device for providing digital certificates for use by devices in authentication operations, the computing device comprising: a memory containing machine readable medium storing machine executable code; one or more processors coupled to the memory and configured to execute the machine executable code to cause the one or more processors to: receive, by a first entity, a cocoon public key for generating a digital certificate, wherein the cocoon public key is generated by expanding a caterpillar public key with a random function and the first entity is uninformed of which device the caterpillar public key is originated from; generate butterfly reconstruction credentials based on the cocoon public key and a random value; generate a certificate based on the butterfly reconstruction credentials and metadata; generate a hash value of both the certificate and a verification public key reserved for the first entity; generate a signature based on the random value, the hash value and a verification private key associated with the verification public key, wherein the one or more processors are further configured to execute the machine executable code to cause the one or more processors to generate the signature by using an isochronous table lookup to speed up signature generation based on a fixed factor of the verification private key; encrypt the certificate and the signature using the cocoon public key; and send an encryption package from the encrypted certificate and signature to a second entity, wherein: the second entity is unable to decrypt the encryption package, and the encryption package is forwarded from the second entity to a requesting device.

5. The computing device of claim 4, wherein the one or more processors are further configured to execute the machine executable code to cause the one or more processors to: sample the random value from a multi-dimensional space; and generate the signature by adding the random value and a product of the hash value and the verification private key.

6. The computing device of claim 4, wherein the one or more processors are further configured to execute the machine executable code to cause the one or more processors to perform an isochronous sequential search for a hex digit among 16 possibilities, and a modular addition into an accumulator.

* * * * *